Aug. 14, 1923.

A. ALBO ET AL 1,464,839

GAUGE

Filed May 2, 1922

INVENTORS
Agostino Albo
Vincenzo Oraselli
John A. Naismith
BY
ATTORNEY

Patented Aug. 14, 1923.

1,464,839

UNITED STATES PATENT OFFICE.

AGOSTINO ALBO AND VINCENZO MASELLIS, OF SAN JOSE, CALIFORNIA.

GAUGE.

Application filed May 2, 1922. Serial No. 557,967.

*To all whom it may concern:*

Be it known that we, AGOSTINO ALBO and VINCENZO MASELLIS, a citizen of the United States, and a subject of the King of Italy, respectively, residents of San Jose, in the county of Santa Clara and State of California, have invented a certain new and useful Improvement in Gauges, of which the following is a specification.

Our invention relates to a gauge for use in the manufacture of lumber.

In the manufacture of lumber from the planks sawn from the log, the single plank is trimmed and cut into boards of varying width. The cutting of the board is determined largely from its character, the resulting boards varying usually from two to twenty-four inches.

It is one object of our invention to provide a device whereby the standard or desired widths of boards may be cut without adjustment of the machine.

It is a further object of our invention to provide a device of the character indicated that may be readily attached to the saw frame; that may be quickly spaced the desired distance from the saw itself; and that is simple in construction, economical to manufacture, and highly efficient in its practical application.

In the drawing:—

Figure 1:
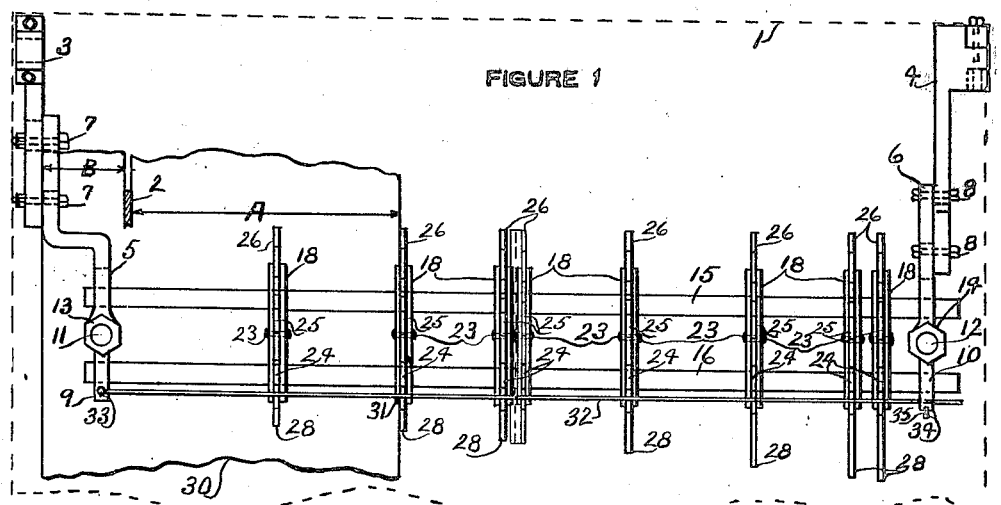
Figure 1 is a plan view of our invention in position on a saw table, parts broken away.
Figure 2:
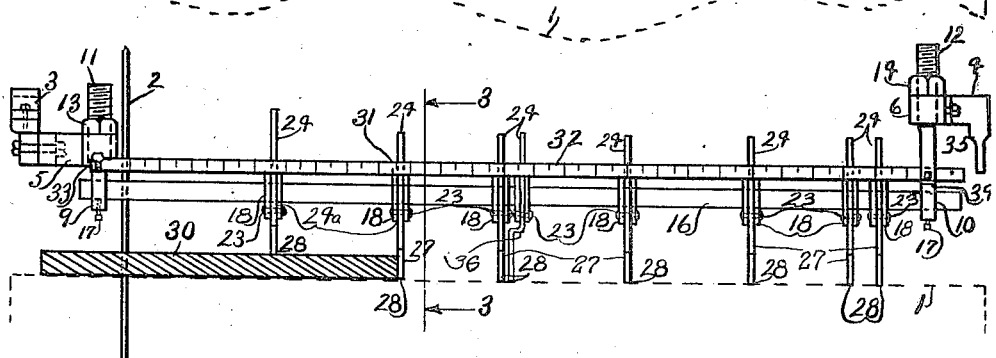
Figure 2 is a front elevation of the same.
Figure 3:
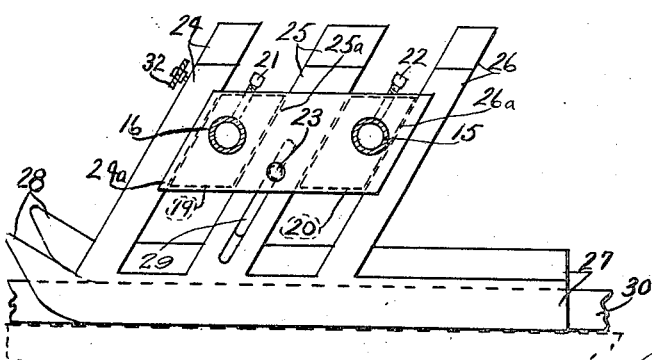
Figure 3 is an enlarged cross-section on line 3—3 of Figure 2, parts broken away.
Figure 4:
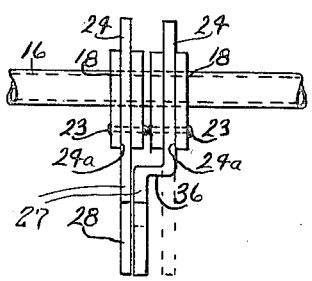
Fig. 4 is a detail view on an enlarged scale of two of the gauge plates.

Referring more particularly to the drawing we show by dotted lines at 1 the saw table of a band saw. The saw being shown at 2 while at 3—4 are two brackets securely mounted upon the saw table frame in any suitable manner not shown. Adjustably mounted upon brackets 3—4 are supporting arms 5—6 held in any position which may be required by means of bolts 7—8 as shown.

The outer ends of arms 5—6 support members 9—10 by means of bolts 11—12 formed integrally therewith and nuts 13—14. Mounted upon members 9—10 are two parallelly arranged rods as shown at 15—16, while at 17 are shown set screws which allow an adjustment of the distance between members 9—10 as well as serving to hold the rods 15—16 in position.

Mounted upon rods 15—16 are a series of frames as at 18. As these frames are all constructed alike only one will be described in detail like parts being referred to by like numbers throughout. Each frame 18 is made up of two side plates spaced a distance apart by plates 19—20, these plates being so placed as to leave angular grooves 24ª— 25ª—26ª between the outside plates as shown. The rods 15—16 pass through the frame 18, the same being held in any given place upon said rods by means of set screws 21—22.

Gauge plate 27 carries a series of upstanding angular lugs 24—25—26 sliding in the grooves 24ª—25ª—26ª above mentioned and has its forward end 28 turned upwardly as shown. The central lug 25 has a slot 29 formed therein through which a pin 23 set in frame 18 passes thus limiting the movement of the gauge plate in its supporting frame as shown. The several gauge plates are constructed exactly alike except for the length of the forward upturned portion 28, each successive plate having its upturned portion 28 advanced a distance with relation to the preceding plate.

At 30 is shown a board being cut by the saw 2 and held in engagement with the second gauge plate 27 which is secured to the supporting rods 15—16 at a point as 31 as shown upon the graduated measuring scale 32. The scale 32 is securely mounted at one end upon member 9 by set screw 33 while the other end is adjustably held in a slot 34 by means of set screw 35. This scale is so located with respect to the several gauge plate members that it is easy to read the distance from the saw to the gauge plate at a glance.

In operation we have a board 30 which has had its edges already trimmed making the board 16¾ inches wide. It is now desired to cut this board into two pieces of 10¾ and 6 inches as shown at "A" and "B" respectively. The second gauge plate 27 is set at 10¾ inches as shown upon scale 32 and the edge of the board held against the same as it is fed into the saw. As the saw is located at the 0 mark on the scale the board next to the gauge plate will be 10¾ inches wide while the other part will be the required 6 inch strip. The first gauge plate 27 which was previously set for another cutting will ride up on the board as it is fed to the saw thus doing away with the time usually wasted in changing this setting to allow the board to pass thereunder. Thus it can be seen that we have provided a gauging device which can be set for any number of cuttings before the lumber is started through the machine and all these different widths of boards cut out without the necessity of changing the gauge plates. This is made possible because the several gauge plates are graduated in length from the minimum length which is next to the saw to the maximum length which is the plate farthest from the said saw thereby permitting a board to be placed in contact with any one plate and shoved under the remaining plates between it and the saw. Thus if we have a wide board which is held against one gauge plate 27 all the plates between that and the saw will ride up on the board without changing their adjustment in relation to the width of the board each one represents.

Thus it is seen that we have provided a machine which is simple to manufacture and install, easily set in any number of positions and easily operated and reset when desired, as well as being highly efficient in its practical application.

Due to the thickness of the two side walls of frames 18 a space is left between any two gauge plates 27 when their frames 18 are placed side by side. As it is often necessary to cut a board having a width which falls between these two gauge plates we have provided a gauge plate 27 bent as shown at 36 which is used in place of the former straight plate 27 as indicated in dotted lines. Thus it is seen that this required distance is secured without disturbing the adjustment of the frames 18.

It is to be understood, of course, that while we have shown and described one particular embodiment of our invention that changes in form, proportion, construction and method of operation may be made within the scope of the appended claims.

We claim:—

1. A gauge of the character indicated including a plate holder comprising a pair of spaced plates having an angular guide formed therebetween, a gauge plate carrying a forwardly extending shoe and an upstanding angularly arranged element adapted to engage said guide, and means for limiting the movement of said element in said guide.

2. A gauge of the character indicated including a plate holder comprising a pair of spaced plates having an angular guide formed therebetween, a gauge plate carrying a forwardly extending shoe and an upstanding angularly arranged element adapted to engage said guide, and means for limiting the movement of said element in said guide, the shoe portion of said gauge being offset laterally a distance.

3. In a device of the character indicated, a pair of plates, a pair of angular spacing elements between said plates, a gauge plate carrying upstanding elements adapted to engage the angular spaces defined by said plates and spacing elements and carrying a forwardly extending shoe, and a stop pin arranged between said plates, one of said upstanding elements having a slot formed therein to engage said pin.

AGOSTINO ALBO.
VINCENZO MASELLIS.